United States Patent Office 3,444,939
Patented May 20, 1969

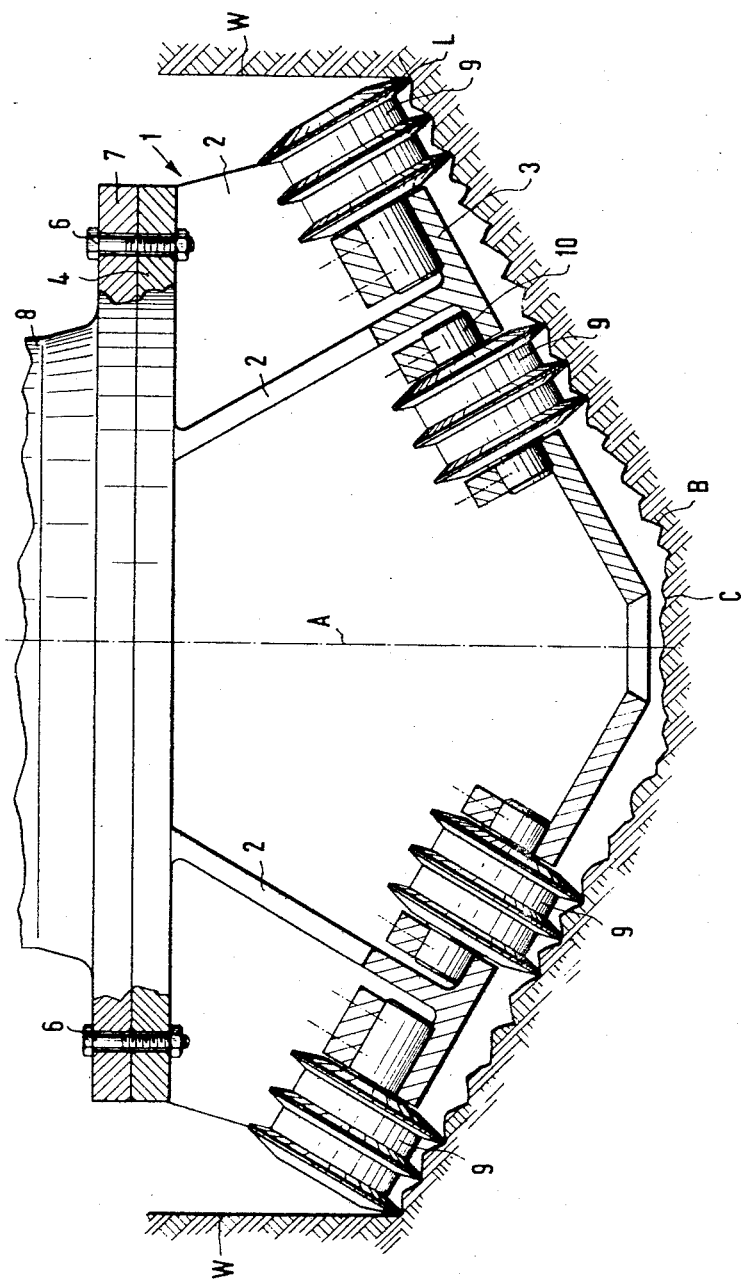

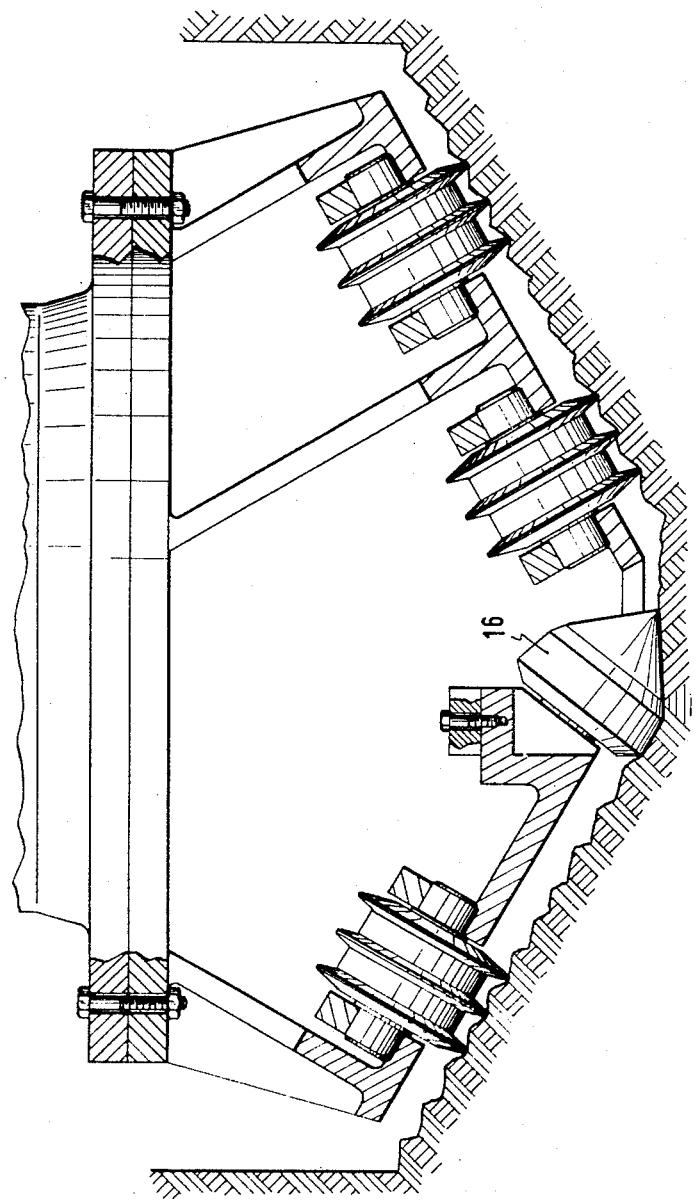

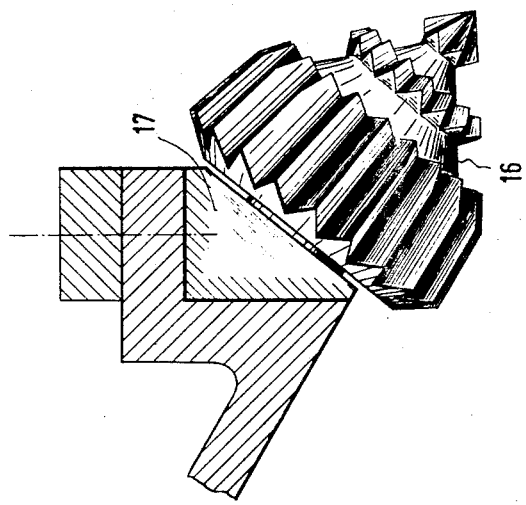
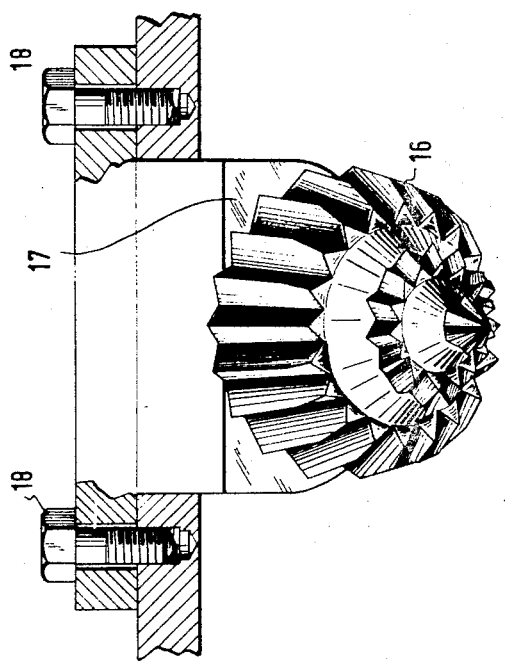

3,444,939
CUTTING ROLLER IN PARTICULAR ROLLER-TYPE ENLARGING BITS
Karl Günther Bechem, Trefendorfer Weg, Hagen, Germany
Continuation-in-part of application Ser. No. 385,424 July 27, 1964. This application Dec. 11, 1967, Ser. No. 689,608
Int. Cl. E21b 9/24
U.S. Cl. 175—334                    1 Claim

ABSTRACT OF THE DISCLOSURE

The specification describes an improved form of rock boring tool with cutting rollers projecting through openings in a shield. The shield is conical and the cutting ribs of the rollers make contact with the rock to be cut along lines generally parallel to the shield face.

---

The present application is a continuation in part of my application Ser. No. 385,424, dated July 27, 1964, now Patent No. 3,358,782.

The present invention relates to boring tools for making holes or tunnels in rock.

One object of the present invention is to provide a boring tool using ribbed cutting rollers in which ribs are arranged along lines making such angles with the axis of tool rotation that an improved cutting action results.

Another object is to provide an improved cutting tool having a shield-like frame.

Further features and advantages of the present invention will appear from the following description of a preferred embodiment of it referring to the attached drawings.

FIGURES 2 and 3 are respectively side views of the tool, these figures also including partial sections taken on the lines II—II and III—III of FIGURE 1.

FIGURE 6 and FIGURE 7 are two views of the central cutting roller of the tool.

Figure 1:
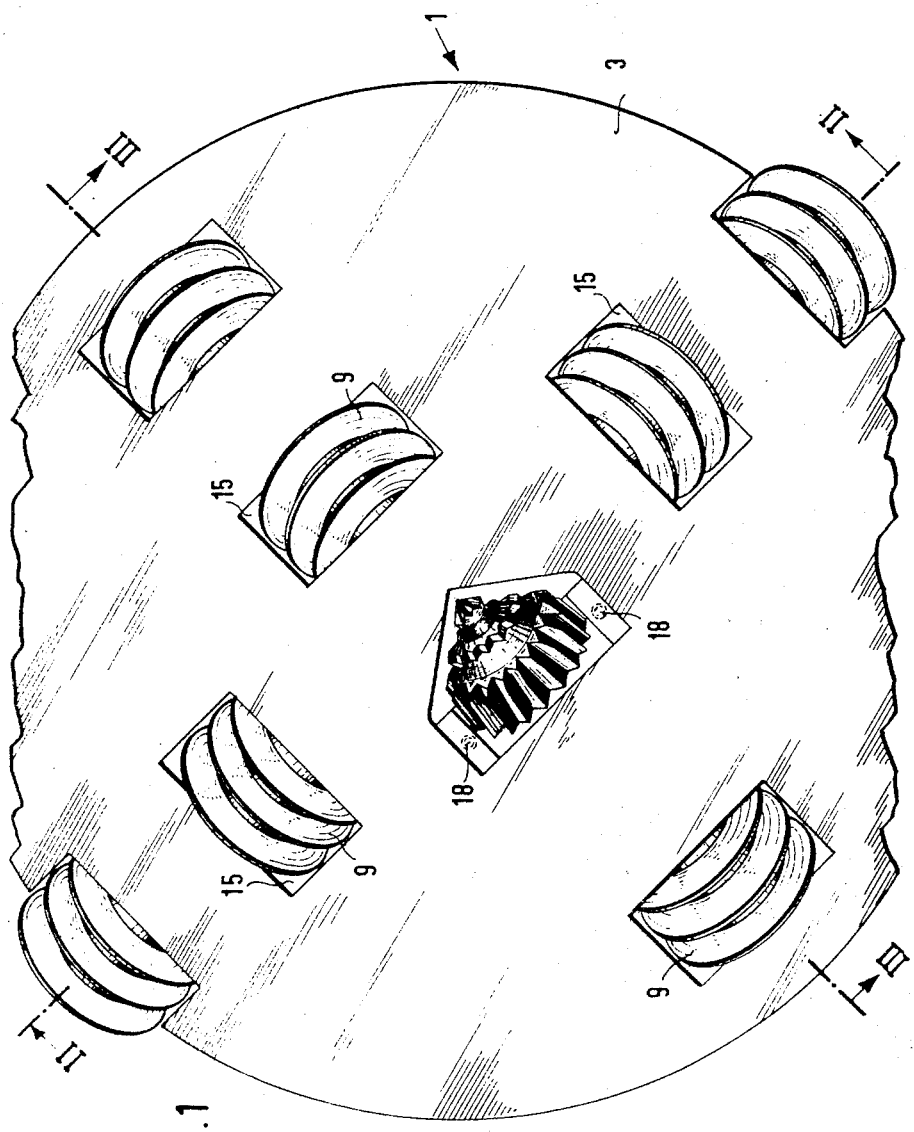
FIGURE 1 is a end-on view of a boring tool embodying my invention.

Referring now to the drawings and more particularly to FIGURES 1, 2 and 3 it will be seen that the rock boring tool in accordance with my invention is arranged to bore a hole or tunnel having cylindrical walls W by removing rock along a breast B at the working end of the hole or tunnel.

The tool comprises a frame denoted by general reference 1 which includes shield-like portion 3 which is generally conical and is connected by webs and such as 2 with a disk-like portion 4. The disk-like portion is connected by bolts 6 with the disk-like portion or flange 7 of the lower end of an elongated boring rod 8 which extends downwards from a suitable driving means causing the rod 8 and the frame 1 to rotate about a vertical central axis A and to advance downwards about this axis so as to extend the hole in a downward direction.

Figure 5:
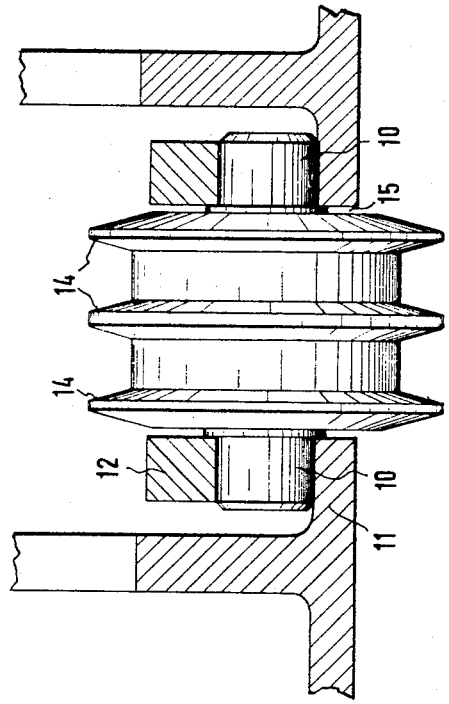
FIGURE 5 is a further section, taken on the line V—V of FIGURE 4 showing the construction of a cutting roller.
Figure 4:
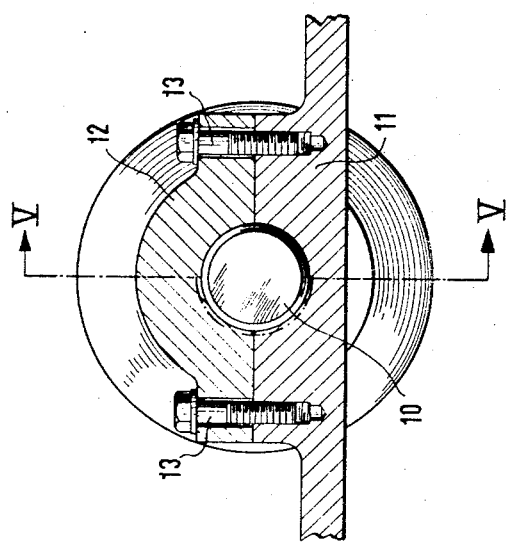
FIGURE 4 is a section on an enlarged scale showing one of the cutting rollers.

The frame carries a number of rock cutting units in the form of rollers 9 which, as can be seen more particularly from FIGURES 4 and 5, are carried on short shafts 10 journalled in bearing means constituted by shaped inner parts 11 of the shield cooperating with bearing parts 12 held in place by bolts 13, the shaft 10 thereby being held inside the shield-like portion of the frame and the rock cutting ribs 14 projecting through openings or recesses 15 in the shield-like portion of the frame 1.

The ribs 14 taper in a radial direction away from the axes of the shafts 10 to provide cutting edges which are sufficiently sharp to cut away the rock in steps as shown in FIGURES 2 and 3 when the frame is rotated and pressed forwards along the axis A by the boring rod 8. The ribs on the rollers 9 cut the rock in a number of steps as shown in the figures. As will be apparent from FIGURE 1 the rollers 9 are arranged to cut the breast B along contiguous annular areas extending from the wall W to a central region where cutting is carried out by a further different type of roller presently to be described.

As can be seen from FIGURE 2 a line L drawn through the foremost parts of cutting ribs on a roller 9 makes an acute angle with the part of the axis A which lies inside the frame 1.

For cutting out the central part of the breast of the rock I employ a toothed roller 16 with a conical working surface as shown in FIGURES 6 and 7; this toothed roller, which can be of a type conventional in the art, is carried on a bracket 17 so that it can rotate, the bracket being fixed to the shield-like part of the frame 1 by means of bolts 18.

In operation the cutting rollers 9 produce a stepped cutting surface which is generally frusto-conical, as shown in FIGURES 2 and 3, and extends from the wall W to a flat central portion C which is cut by the toothed conical roller 16.

While I have described an embodiment of my invention in detail, it is to be understood that the inclusion of such details is only to facilitate construction of the invention by those in the art and not by way of limitation.

I claim:
1. A rotary boring tool comprising a rotary driving boring rod,
   a conical shield plate,
   web means connecting said shield plate to said boring rod and spacing said shield plate outwardly from said rod, thereby to enable rotational and advancing movements of said shield plate along with said boring rod,
   said shield plate having a plurality of relatively small openings,
   rotary cutting rollers having portions thereof projecting through said openings respectively, each cutting roller having circumferential ribs for rock cutting purposes, a line drawn through the foremost parts of adjacent ribs in the direction of advance making an cute angle with the axis which lies within said shield plate, and
   a mounting for each cutting roller arranged on the rear side of said shield plate and providing a bearing for same, whereby access to said cutting rollers is had without removal of the boring structure from the bore hole.

References Cited

UNITED STATES PATENTS

| | | | |
|---|---|---|---|
| 930,758 | 8/1909 | Hughes | 175—334 |
| 2,201,219 | 5/1940 | Bell | 175—334 |
| 2,310,289 | 2/1943 | Hokanson | 175—378 X |
| 2,759,706 | 8/1956 | Peter | 175—378 |
| 3,170,524 | 2/1965 | Trosken | 175—344 X |
| 3,185,226 | 5/1965 | Robbins | 175—344 X |
| 3,203,492 | 8/1965 | Lichte | 175—334 |
| 3,285,355 | 11/1966 | Neilson | 175—334 |

NILE C. BYERS, *Primary Examiner.*